US008648901B2

(12) United States Patent
Sakurai et al.

(10) Patent No.: US 8,648,901 B2
(45) Date of Patent: Feb. 11, 2014

(54) IMAGING APPARATUS, IMAGING METHOD AND ENDOSCOPE APPARATUS (75) Inventors: Tetsuo Sakurai, Kumagaya (JP); Toshiaki Utsumi, Akishima (JP); Yoshiyuki Niijima, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 140 days.

(21) Appl. No.: 13/172,626

(22) Filed: Jun. 29, 2011

(65) Prior Publication Data

US 2012/0133751 A1    May 31, 2012

(30) Foreign Application Priority Data

Nov. 29, 2010    (JP) .................................. 2010-265170

(51) Int. Cl.
*H04N 7/18*    (2006.01)
(52) U.S. Cl.
USPC ............................................................ 348/65
(58) Field of Classification Search
USPC ..................... 348/72, 73, 241–251; 396/17
See application file for complete search history.

(56) References Cited

U.S. PATENT DOCUMENTS

| 6,288,758 | B1 * | 9/2001 | Chujo ............................ 348/807 |
| 6,975,351 | B2 | 12/2005 | Ikeda et al. |
| 7,804,523 | B2 | 9/2010 | Ikeda et al. |
| 2005/0259166 | A1 * | 11/2005 | Tsuda et al. ................... 348/241 |
| 2005/0280722 | A1 * | 12/2005 | Kadohara ................. 348/231.99 |
| 2006/0092477 | A1 * | 5/2006 | Okado ............................ 358/448 |
| 2010/0331624 | A1 * | 12/2010 | Suzuki et al. ................... 600/109 |
| 2011/0058072 | A1 * | 3/2011 | Wang et al. ................... 348/242 |

FOREIGN PATENT DOCUMENTS

| JP | 06-086096 | 3/1994 |
| JP | 8-131401 | 5/1996 |
| JP | 9-205586 | 8/1997 |
| JP | 09-294223 | 11/1997 |
| JP | 2000-224487 | 8/2000 |
| JP | 2002-281395 | 9/2002 |

(Continued)

OTHER PUBLICATIONS

Japanese Patent Application No. 2010-261140; Notice of Reasons for Rejection; Mailed Feb. 28, 2012 (with English translation).

(Continued)

*Primary Examiner* — Mehrdad Dastouri
*Assistant Examiner* — Mohammed Rahaman
(74) *Attorney, Agent, or Firm* — Blakely, Sokoloff, Taylor & Zafman LLP (57) ABSTRACT A head separated type imaging apparatus includes a head unit and a main unit which are separated, the head unit imaging a subject and the main unit processing an imaging signal transmitted from the head unit. The head unit includes an imaging unit having a plurality of pixels and imaging the subject, and a storage unit storing correction information for pixels for which a data amount of correction information is larger than a predetermined threshold out of correction information correcting noise of the plurality of pixels and remaining correction data. The main unit includes a correction information obtaining unit obtaining the correction information for pixels for which the data amount of correction information is larger than the predetermined threshold in priority and then obtaining the remaining correction data, and a correcting unit correcting, when the correction information obtaining unit completes obtaining of the correction information for pixels for which the data amount of correction information is larger than the predetermined threshold, an image signal transmitted from the imaging unit of the head unit based on the obtained correction information.

15 Claims, 8 Drawing Sheets (56) References Cited

FOREIGN PATENT DOCUMENTS

| | | | |
|---|---|---|---|
| JP | 2003-018475 | 1/2003 | |
| JP | 2003-087654 | 3/2003 | |
| JP | 2003-333435 | 11/2003 | |
| JP | 2006-157851 | 6/2006 | |
| JP | 2010-081975 | 4/2010 | |
| JP | 2010081975 A * | 4/2010 | ............ H04N 5/225 |
| JP | 2010-161663 | 7/2010 | |

OTHER PUBLICATIONS

Japanese Patent Application No. 2010-265170, Notice of Reasons for Rejection, mailed Nov. 15, 2011, (with English Translation).

English Machine Translation of Japanese Patent Application No. 2010-081975.

Computer generated English translation of JP 06-086096.

* cited by examiner

COLOR DIFFERENCE LINE
SEQUENTIAL ARRAY

| M | G | M | G |
|---|---|---|---|
| Y | C | Y | C |
| G | M | G | M |
| Y | C | Y | C |
| M | G | M | G |
| Y | C | Y | C |
| G | M | G | M |
| Y | C | Y | C |

BAYER ARRAY

| G | R | G | R |
|---|---|---|---|
| B | G | B | G |
| G | R | G | R |
| B | G | B | G |
| G | R | G | R |
| B | G | B | G |
| G | R | G | R |
| B | G | B | G |

IMAGING APPARATUS, IMAGING METHOD AND ENDOSCOPE APPARATUS

CROSS-REFERENCE TO RELATED APPLICATIONS

This application is based upon and claims the benefit of priority from the prior Japanese Patent Application No. 2010-265170, filed on Nov. 29, 2010; the entire contents of which are incorporated herein by reference.

FIELD

Embodiments described herein relate generally to an imaging apparatus, an imaging method, and an endoscope apparatus using an image sensor such as a CCD sensor or a CMOS sensor.

BACKGROUND

Among conventional imaging apparatuses, there is a head separated type imaging apparatus including a head and a main unit which are separated, the head having a CCD (Charge Coupled Device) sensor, a CMOS (Complementary Metal Oxide Semiconductor) sensor, or the like as an image sensor and the main unit processing a signal of an image (hereinafter referred to as an image signal) captured by the image sensor. In the image sensor provided in the imaging apparatus, there exist two types of noise called fixed pattern noise (FPN) and random noise. Between these two types of noise, the fixed pattern noise is generated in a certain pixel of the image sensor and is correctable. Accordingly, in a conventional head separated type imaging apparatus, correction data (correction information) for the image sensor are retained on the head side, the correction data are transferred from the head to the main unit when the imaging apparatus is activated, and the image signal transmitted from the image sensor of the head is corrected using the transferred correction data.

DETAILED DESCRIPTION

An imaging apparatus according to an embodiment is a head separated type imaging apparatus including a head unit and a main unit which are separated, the head unit imaging a subject and the main unit processing an imaging signal transmitted from the head unit. The head unit includes an imaging unit having a plurality of pixels and imaging the subject, and a storage unit storing correction information for pixels for which a data amount of correction information is larger than a predetermined threshold out of correction information correcting noise of the plurality of pixels and remaining correction data. The main unit includes a correction information obtaining unit obtaining the correction information for pixels for which the data amount of correction information is larger than the predetermined threshold in priority and then obtaining the remaining correction data, and a correcting unit correcting, when the correction information obtaining unit completes obtaining of the correction information for pixels for which the data amount of correction information is larger than the predetermined threshold, an image signal transmitted from the imaging unit of the head unit based on the obtained correction information.

Hereinafter, embodiments of the present invention will be described in detail with reference to the drawings.

(First Embodiment)

In a first embodiment, the structure of a head separated type endoscope apparatus as an example of an imaging apparatus will be described. Among the above-described fixed pattern noise, there are noise whose level (intensity) does not change due to external environment (for example, temperature and brightness) and noise whose level changes due to the external environment. In the first embodiment, the case of correcting the noise whose level does not change due to the external environment (hereinafter referred to as base noise) will be described. In the first embodiment, an embodiment using CMOS (Complementary Metal Oxide Semiconductor) sensors as an image sensor (imaging device) will be described. However, any other sensor such as a CCD (Charge Coupled Device) sensor or the like may be used instead of the CMOS sensors.

Figure 1:
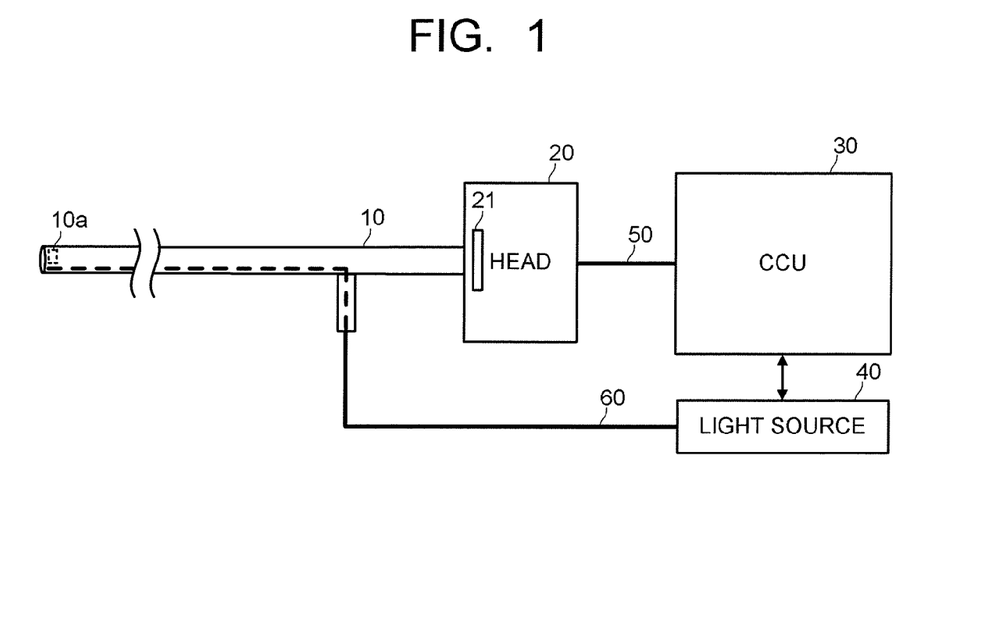
FIG. 1 is a structural diagram of an endoscope apparatus according to a first embodiment.

FIG. 1 is a structural diagram of an endoscope apparatus 1 according to the first embodiment. The endoscope apparatus 1 includes a scope 10 provided with an objective lens 10a on a leading end and inserted into a subject to be inspected, a head 20 outputting an image signal captured by an image sensor 21 (imaging unit) situated on an imaging plane of the objective lens 10a to a CCU via a camera cable 50, a CCU (camera control unit) 30 processing the image signal outputted from the head 20, a light source 40 for exposing an imaging area, and an optical fiber 60 for guiding the light from the light source 40 to a leading end portion of the scope 10.

The camera cable 50 houses signal wires for transmitting/receiving an image signal and a control signal between the head 20 and the CCU 30, a power line for supplying power from the CCU 30 to the head 20, and so on.

(Structure of the Head 20)

Figure 2:
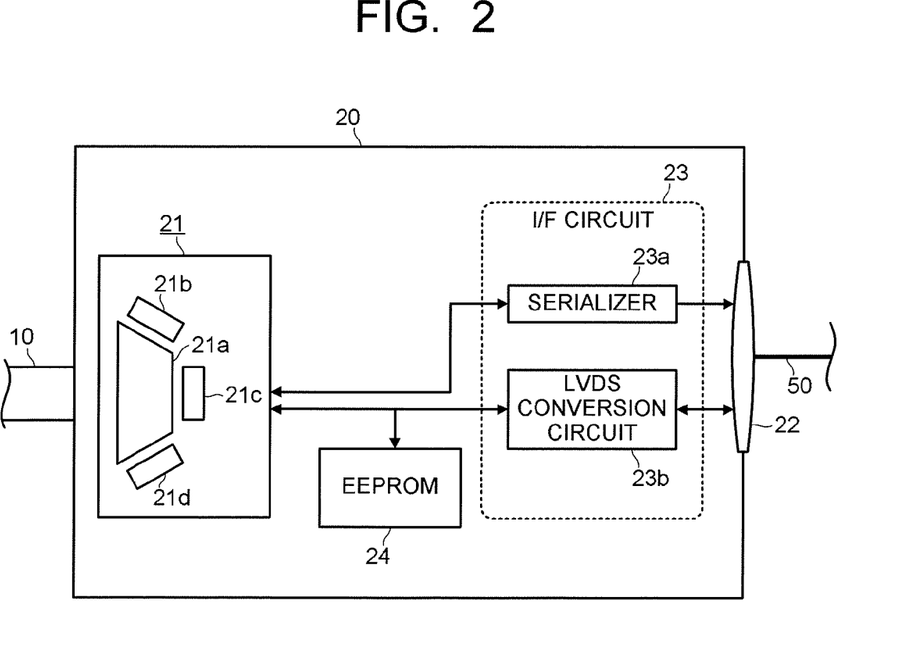
FIG. 2 is a structural diagram of a head.

FIG. 2 is a structural diagram of the head 20. The head 20 includes the image sensor 21, a connection terminal 22, an I/F circuit 23, and an EEPROM 24. The image sensor 21 is a three plate type image sensor, and is made up of a prism 21a separating the light from the objective lens 10a into three colors of R (red), G (Green), and B (Blue), and CMOS sensors 21b to 21d converting the light separated into the colors of R, G, B to electric signals. The three plate type image sensor has a characteristic in that it excels in color reproducibility because this sensor retains information of RGB for every pixel. The image sensor 21 is a color image sensor corresponding to full HD (high definition).

The image sensor 21 may be a single plate type instead of the three plate type. The single plate type image sensor has a color filter on each pixel of a CMOS sensor, and separates an electric signal outputted from the CMOS sensor into R, G, B signals in a circuit. This sensor has a characteristic in that it can be produced inexpensively because it is unnecessary to adhere the prism and the CMOS sensor to each other.

Figure 3A:
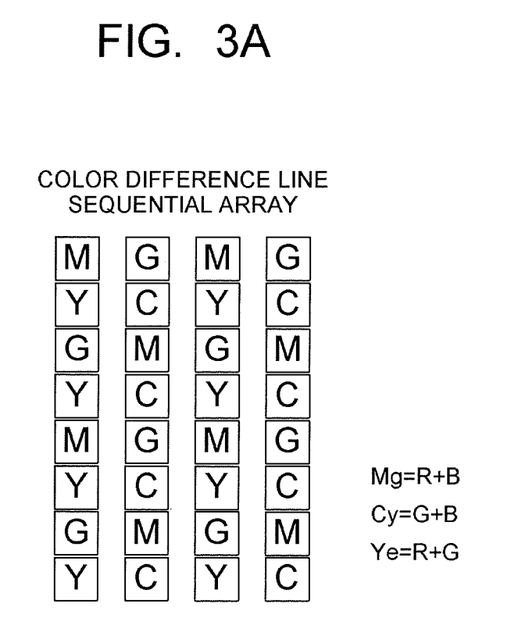
FIGS. 3A and 3B are diagrams illustrating examples of arrays of color filters.
Figure 3B:
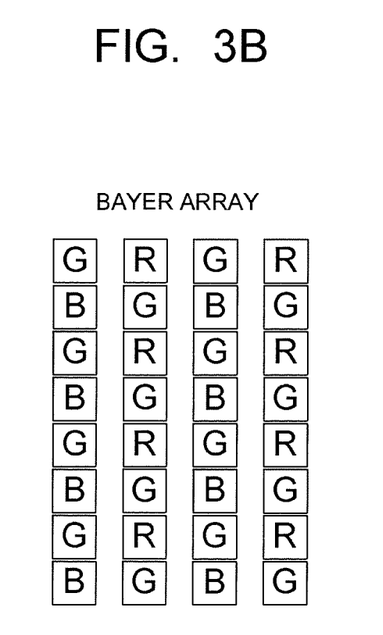

There are various types of arrays for color filters. FIGS. 3A and 3B are diagrams illustrating examples of arrays of color filters. FIG. 3A illustrates a color difference line sequential array. In the color difference line sequential array, color filters of M (R and B), Y (G and B), C (R and G) called a complementary color and G are arranged in the array illustrated in FIG. 3A. In the color difference line sequential array, two primary colors (R and B, G and B, R and G) are obtained by one pixel by using the complementary colors M, Y, C. The color difference line sequential array is preferred for an image sensor driven by interlace scanning.

FIG. 3B illustrates a Bayer array. In the Bayer array, color filters of primary colors (R, G, B) are arrayed, where the number of color filters of G is double the number of color filters of R and B. This is because the human eyes are highly sensitive to green light, and there is an effect to increase the resolution of a captured image. Any array of color filters other than those illustrated in FIGS. 3A and 3B may be employed in the image sensor 21 of the endoscope apparatus 1 according to the first embodiment.

The camera cable 50 is connected to the connection terminal 22. The I/F circuit 23 includes a serializer 23a and an LVDS conversion circuit 23b, and transmits an image signal outputted from the image sensor 21 as a digital signal as it is to the CCU 30 via the camera cable 50 connected to the connection terminal 22. The EEPROM 24 is an electrically rewritable non-volatile memory (for example, a flash memory), in which correction data (correction information) and setting conditions (for example, frame rate, gain, and sensitivity) of the image sensor 21, and so on are stored. For the memory storing the correction data, the setting conditions, and so on, any memory other than the EEPROM 24 may be used as long as it is rewritable.

(Correction Data)

Figure 4:
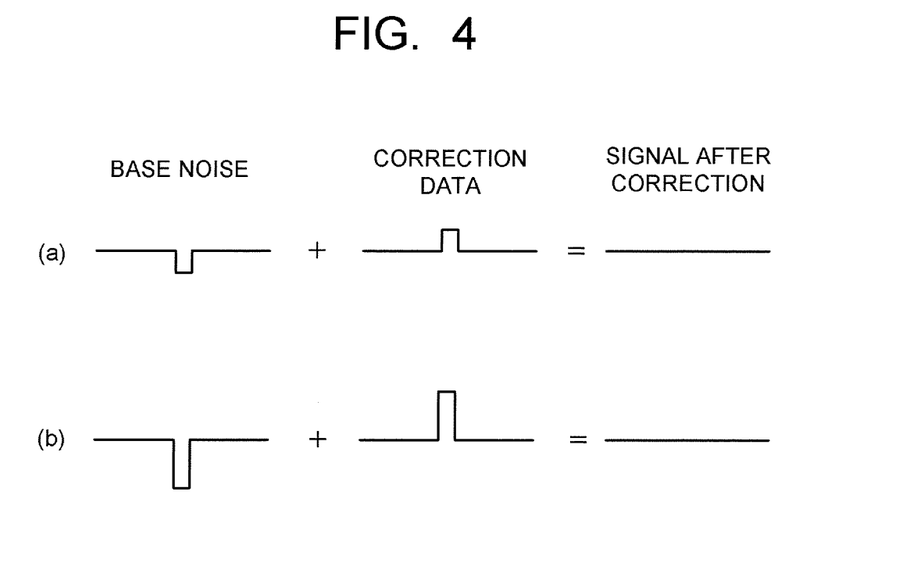
FIG. 4 is an explanatory diagram of data.

FIG. 4 is an explanatory diagram of correction data stored in the EEPROM 24. As described above, in the first embodiment, the base noise whose level (intensity) does not change due to the external environment (for example, temperature and brightness) is corrected. Accordingly, the base noise of the CMOS sensors provided in the image sensor 21 is measured in advance for every pixel, and correction data which cancel out the base noise as illustrated in FIG. 4 are stored for every pixel in the EEPROM 24. Then, the stored correction data are added to the image signal outputted from the image sensor 21, so as to correct the image signal. The base noise can be measured by instructing the CMOS sensors to output a predetermined voltage (reference voltage), and checking a displacement of an actually outputted voltage from the reference voltage for every pixel.

In the first embodiment, a picture signal of each pixel is of 12 bits at the maximum. Accordingly, the correction data for each pixel is of 12 bits at the maximum. That is, the correction data when the level of the base noise is maximum is of 12 bits, and the correction data when the level of the base noise is zero is of 0 (zero) bit.

The EEPROM 24 stores the correction data for all the pixels of the CMOS sensors provided in the image sensor 21 in the order of following 1 to 3. When the correction data stored in the EEPROM 24 are read, they are read in the order of 1→2→3.

1: The number of pixels for which there are correction data larger than 4 bits.

2: The correction data of 8 higher-order bits and addresses of pixels for which there are correction data larger than 4 bits.

3: The correction data of 4 lower-order bits of all the pixels.

In the first embodiment, for pixels for which there are correction data larger than 4 bits, the correction data are adjusted to 12 bits, and for pixels for which there are correction data of 4 bits or smaller, the correction data are adjusted to 4 bits (specifically, data irrelevant to correction (for example, Null (0)) is inserted). By thus making the number of bits of the correction data constant, an MPU 35c which will be described later is able to recognize the number of read correction data when reading the correction data from the EEPROM 24.

(Creation of the Correction Data)

Figure 5:
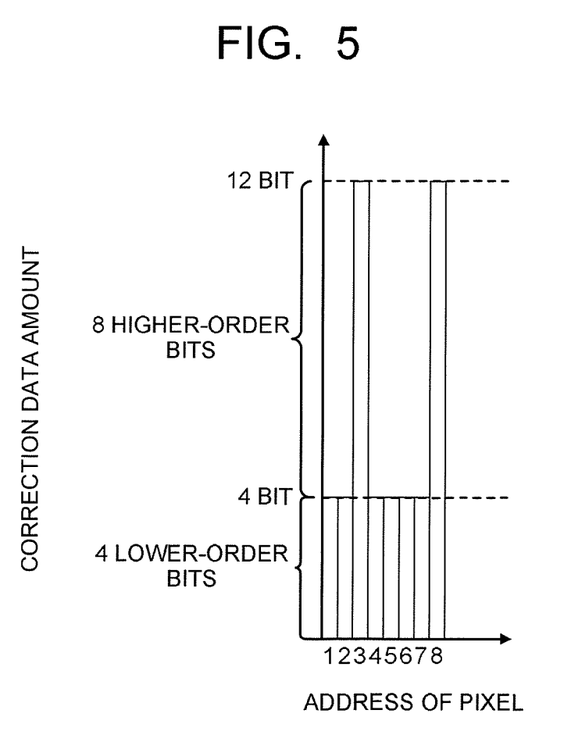
FIG. 5 is an explanatory diagram of a creation procedure of correction data.

Next, a creation procedure of the correction data to be stored in advance in the EEPROM 24 will be described. FIG. 5 is an explanatory diagram of the creation procedure of the correction data. First, the correction data which cancel out the base noise are created for every pixel of the CMOS sensors. The size (data amount) of the base noise differs for every pixel, and thus the data amount of correction data needed for canceling out the base noise differs for every pixel as well. For pixels for which there are correction data larger than 4 bits, the correction data are adjusted to 12 bits, and for pixels for which there are correction data of 4 bits or smaller, the correction data are adjusted to 4 bits, as illustrated in FIG. 5.

In the first embodiment, first, out of the correction data of respective pixels of the CMOS sensors, the number of pixels for which the data amount is larger than 4 bits is stored in the EEPROM 24. Next, data of 8 higher-order bits of the correction data for pixels for which the data amount is larger than 4 bits are stored in the EEPROM 24 together with addresses of the pixels. Finally, data of 4 lower-order bits for all the pixels of the CMOS sensors are stored in the EEPROM 24 in the order of addresses.

In the example illustrated in FIG. 5, the correction data for pixels with addresses of "3" and "8" are larger than 4 bits, and thus the number of pixels "2" is stored first in the EEPROM 24. Then, 8 higher-order bits of the correction data for addresses of "3" and "8" are stored together with the addresses. Finally, correction data of 4 lower-order bits of the correction data for the pixels with addresses ("1", "2", "4" to "7") other than "3" and "8" and correction data of 4 lower-order bits of the correction data for the pixels with the addresses "3" and "8" are stored in the order of addresses.

(Structure of the CCU 30)

Figure 6:
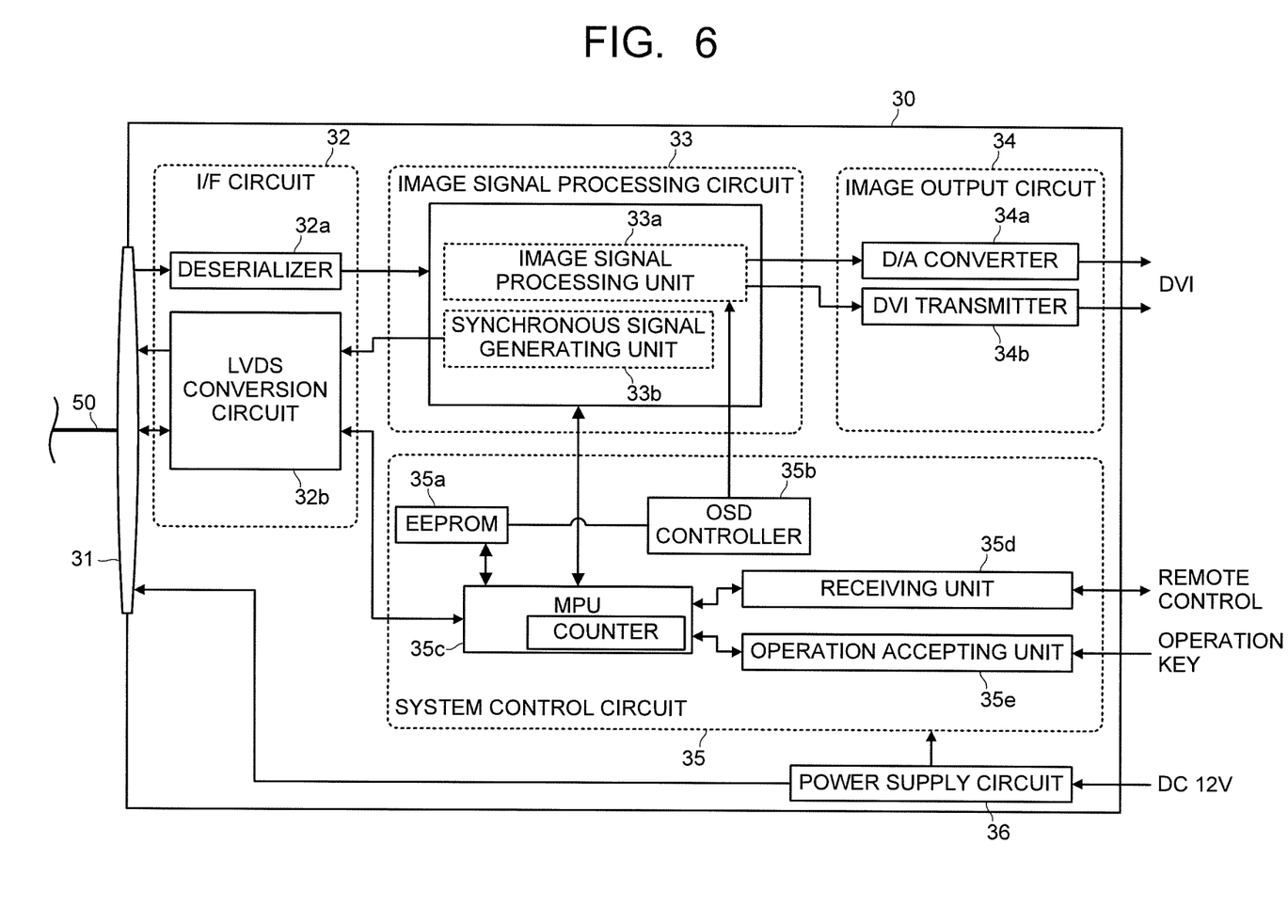
FIG. 6 is a structural diagram of a CCU.

FIG. 6 is a diagram illustrating the structure of the CCU 30. The CCU includes a connection terminal 31, an I/F circuit 32, an image signal processing circuit 33, an image output circuit 34, a system control circuit 35, and a power supply circuit 36. The camera cable 50 is connected to the connection terminal 31. The I/F circuit 32 includes a deserializer 32a and an LVDS conversion circuit 32b, and outputs the image signal transmitted from the head 20 to the image signal processing circuit 33. The I/F circuit 32 transmits a control signal outputted from the system control circuit 35 to the head 20 via the camera cable 50 connected to the connection terminal 31.

The image signal processing circuit 33 includes an image signal processing unit 33a and a synchronous signal generating unit 33b. The image signal processing unit 33a processes the image signal outputted from the I/F circuit 32 and outputs the processed signal to the image output circuit 34. The image signal processing unit 33a sorts respective image signals of pixels outputted from the I/F circuit 32 in the order of the addresses of pixels, and thereafter corrects the image signals based on the correction data read from the EEPROM 24 of the head 20 by an MPU 35c, which will be described later. Correction operation performed by the image signal processing unit 33a will be described in detail in "Correction operation of the image signal processing unit 33a" later.

The image signal processing unit 33a performs enhancement processing such as de-mosaicking processing, knee correction, gamma correction, detail or matrix processing, or the like on the image signal after correction, and inputs the resultant signal to the image output circuit 34.

The synchronous signal generating unit 33b generates a synchronous signal used for imaging with the image sensor 21. The synchronous signal is generated at predetermined intervals corresponding to a set frame rate. The generated synchronous signal is outputted to the MPU 35c, and is transmitted from the I/F circuit 32 to the head 20 via the camera cable 50 connected to the connection terminal 31.

The image output circuit 34 includes a D/A converter 34a and a DVI (digital visual interface) transmitter 34b, and outputs an image signal processed in the image signal processing circuit 33 to an external monitor (not illustrated) as an analog and digital RGB (red, green, blue) signals.

The system control circuit 35 includes the EEPROM 35a, an OSD (on-screen display) controller 35b, the MPU (micro processing unit) 35c, a receiving unit 35d, and an operation accepting unit 35e, and controls the entire endoscope apparatus 1. The EEPROM 35a is an electrically rewritable ROM. The EEPROM 35a stores setting conditions (for example, exposure period) of the CCU 30 and the total number of pixels of the CMOS sensors of the image sensor 21. The correction data read from the EEPROM 24 of the head 20 are stored in the EEPROM 35a.

The exposure period is a parameter for adjusting the brightness of an image captured by the image sensor 21, and is equivalent to a shutter speed. As the exposure period, it will suffice to have a few types (for example, $1/240$ seconds and $1/120$ seconds). Setting of this exposure period can be changed through an external PC (personal computer) or operation keys, which will be described later.

For the memory storing these setting conditions, any memory other than the EEPROM may be used as long as it is rewritable. The OSD controller 35b displays text data, bit map, and/or the like in a superposed manner on the image of an image signal processed in the image signal processing unit 33a.

The MPU 35c controls the head 20, the CCU 30, and the light source 40 based on a remote control signal received in the receiving unit 35d, a processing content accepted in the operation accepting unit, and set information stored in the EEPROM 35a.

The MPU 35c reads out the correction data stored in the EEPROM 24 of the head 20 via the camera cable 50 in the order that the data are stored, and stores them in the EEPROM 35a. The MPU 35c outputs a reading completion signal to the image signal processing unit 33a of the image signal processing circuit 33 every time reading of eachportion of the correction data of 8 higher-order bits and 4 lower-order bits is completed. Reading operation performed by the MPU 35c will be described in detail in (Reading operation of the MPU 35c) later.

Reading of the correction data from the EEPROM 24 of the head 20 by the MPU 35c is performed in a period in which no other data (for example, the image signal of the image sensor 21) are transmitted/received between the head 20 and the CCU 30.

The receiving unit 35d receives the control signal for remote control transmitted from an external PC or the like, and outputs the received signal to the MPU 35c. Communication with the external PC is performed via an RS232-C serial port. The operation accepting unit 35e accepts processing operated by an external operation key, and outputs the accepted processing to the MPU 35c.

The power supply circuit 36 converts externally supplied power into a predetermined voltage, and supplies the converted voltage to respective circuits in the CCU 30. Further, the power is also supplied to the head 20 via the camera cable 50 connected to the connection terminal 31.

The light source 40 includes a lamp and a lens. The optical fiber 60 is connected to the light source 40. The lamp is, for example, a xenon lamp and emits light for exposing the imaging area of the image sensor 21. The lens guides the light emitted from the lamp into the optical fiber 60. The light guided into the optical fiber 60 is led to the leading end portion of the scope 10 for exposing the imaging area of the image sensor 21.

(Reading Operation of the MPU 35c)

Next, reading of the correction data of the EEPROM 24 of the head 20 will be described. First, the MPU 35c reads out the number of pixels stored in the EEPROM 24 of the head 20. Next, the MPU 35c reads the correction data of 8 higher-order bits and the addresses of pixels from the EEPROM 24 and stores them in the EEPROM 35a of the CCU 30. The read correction data of 8 higher-order bits are stored in the order of the addresses being read together with the correction data.

The MPU 35c increments the value of an internal counter every time the correction data of 8 higher-order bits and the address of a pixel are read (specifically, every time data of the amount of the correction data and the address are read from the EEPROM 24). At the point the value of the internal counter becomes equal to the number of pixels read from the EEPROM 24, the MPU determines that reading of the correction data of 8 higher-order bits is finished, and outputs the reading completion signal for the first time.

After reading the correction data of 8 higher-order bits, the MPU 35c subsequently reads the correction data of 4 lower-order bits and stores the read correction data in the EEPROM 35a of the CCU 30. The correction data of 4 lower-order bits are not correlated with addresses, but are added to all the pixels in the order of the addresses of pixels. Thus, the MPU 35c stores the correction data of the 4 lower-order bits in the EEPROM 35a in the order of reading them.

The MPU 35c increments the value of the internal counter every time the correction data of 4 lower-order bits are read (specifically, every time data of the amount of the number of bits (4 bits) of the correction data are read from the EEPROM 24). At the point the value of the internal counter becomes equal to the total number of pixels of CMOS of the image sensor 21 stored in the EEPROM 35a, the MPU determines that reading of the correction data of 4 lower-order bits is finished, and outputs the reading completion signal for the second time. The correction data of 4 lower-order bits are added to the data of 8 higher-order bits read in advance and stored.

(Correction Operation of the Image Signal Processing Unit 33a)

Next, correction operation of the image signal processing unit 33a of the CCU 30 will be described. When the reading completion signal for the first time is inputted from the MPU 35c, the image signal processing unit 33a corrects the image signal from the image sensor 21 based on the correction data of 8 higher-order bits, which are stored in the EEPROM 35a of the CCU 30 from the EEPROM 24 of the head 20 by the MPU 35c.

The image signal processing unit 33a sorts image signals of respective pixels in the order of addresses based on the address given to the image signal of every pixel, and thereafter adds the correction data of 8 higher-order bits stored in the EEPROM 35a to image signals having the same addresses, to thereby correct the image signals. The correction data stored in the EEPROM 35a by the MPU 35c are created to cancel out the base noise of the CMOS sensors provided in the image sensor 21, and thus image signals can be corrected by adding the correction data to the image signals having the same addresses.

Upon input of the reading completion signal for the second time from the MPU 35c, the image signal processing unit 33a corrects the image signal from the image sensor 21 based on the correction data of all the pixels, which are stored in the EEPROM 35a of the CCU 30 from the EEPROM 24 of the head 20 by the MPU 35c.

The image signal processing unit 33a sorts image signals of respective pixels in the order of addresses based on the address given to the image signal of every pixel, and thereafter adds the correction data (of 12 bits) in the order of being stored in the EEPROM 35a to the image signals sorted in the order of addresses, to thereby correct the image signal. Since the correction data are stored in the EEPROM 35a in the order of addresses, the image signals can be corrected by sequentially adding the correction data of respective pixels stored in the EEPROM 35a to the image signals sorted in the order of addresses.

(Operation of the Endoscope Apparatus 1)

Figure 7:
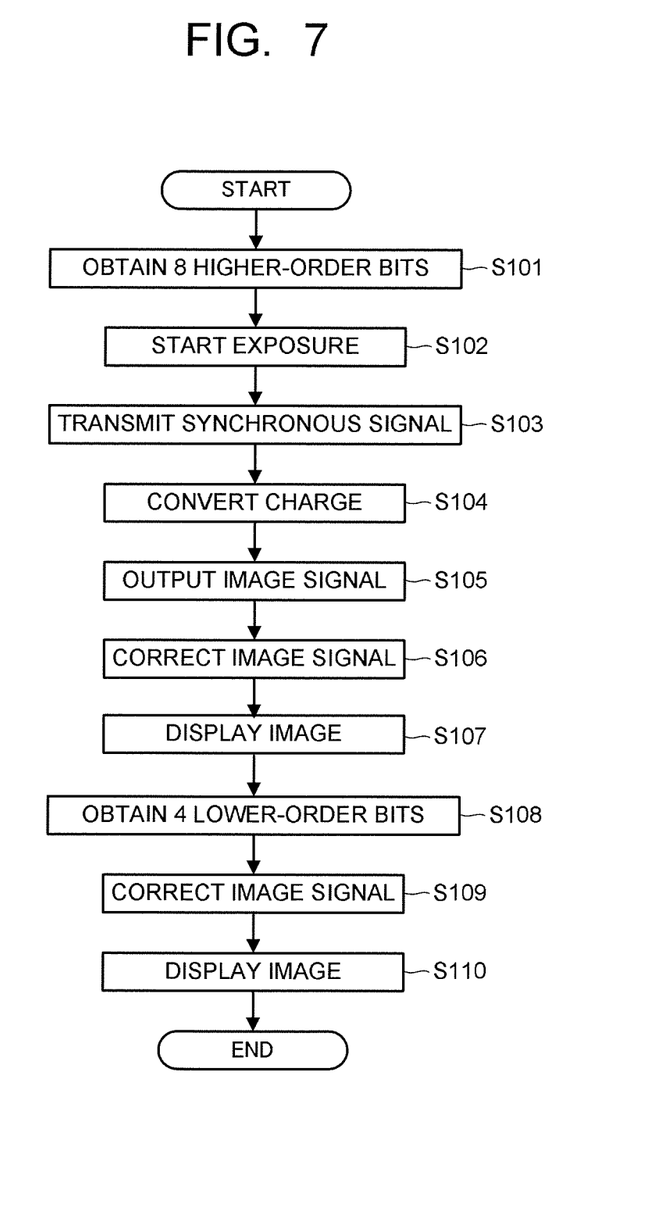
FIG. 7 is a flowchart illustrating operation of the endoscope apparatus.

Next, operation of the endoscope apparatus 1 according to the first embodiment will be described. FIG. 7 is a flowchart illustrating the operation of the endoscope apparatus 1 according to the first embodiment.

(Step S101)

When the power is turned on, the MPU 35c reads out the correction data of 8 higher-order bits of certain pixels stored in the EEPROM 24 of the head 20, and stores the read correction data in the EEPROM 35a. When reading the correction data of 8 higher-order bits stored in the EEPROM 24 of the head 20 and storing them in the EEPROM 35a are completed, the MPU 35c outputs the reading completion signal for the first time.

(Step S102)

The light source 40 turns on the lamp 41 based on the control signal from the MPU 35c. The light from the lamp 41 is guided into the optical fiber 60 and is radiated via the leading end portion of the scope 10 for exposing the imaging area of the image sensor 21.

(Step S103)

The synchronous signal generating unit 33b generates a synchronous signal and transmits the generated synchronous signal from the I/F circuit 32 to the head 20 at predetermined time intervals via the camera cable 50 connected to the connection terminal 31.

(Step S104)

Upon reception of the synchronous signal transmitted from the synchronous signal generating unit 33b via the head 20, the image sensor 21 accumulates a charge in a phototransistor for every scanning line, converts the accumulated charges in respective phototransistors into voltages, and amplifies and reads out the voltages.

(Step S105)

The charges accumulated in the respective phototransistors of the image sensor 21 are converted into voltages for every scanning line, and thereafter amplified, read out, and transmitted to the CCU 30 as an image signal via the camera cable 50 connected to the head 20.

(Step S106)

When the reading completion signal is inputted from the MPU 35c, the image signal processing unit 33a of the image signal processing circuit 33 performs sorting of pixel information in the image signal outputted from the I/F circuit 32, and performs correction on the sorted image signal. The image signal processing unit 33a corrects the sorted image signal based on the correction data of 8 higher-order bits stored in the EEPROM 35a. Furthermore, the image signal processing unit 33a performs enhancement processing and/or the like on the image signal after correction, and then outputs the processed image signal to the image output circuit 34.

(Step S107)

The image output circuit 34 outputs the image signal outputted from the image signal processing unit 33a to an external monitor (not illustrated) as an analog and digital RGB (red, green, blue) signals, and a corrected image is displayed on this monitor.

(Step S108)

When reading the correction data of 8 higher-order bits stored in the EEPROM 24 of the head 20 and storing them in the EEPROM 35a are completed, the MPU 35c subsequently reads out the correction data of 4 lower-order bits of all the pixels stored in the EEPROM 24 and stores the read correction data in the EEPROM 35a. At this time, the MPU 35c adds the read correction data of 4 lower-order bits to the data of 8 higher-order bits read in advance and stores them.

By this reading, the correction data stored in the EEPROM 35a become 12-bit data. When reading of the correction data of 4 lower-order bits stored in the EEPROM 24 of the head 20 and storing them in the EEPROM 35a are completed, the MPU 35c outputs the reading completion signal for the second time.

(Step S109)

When the reading completion signal for the second time is inputted from the MPU 35c, the image signal processing unit 33a of the image signal processing circuit 33 corrects the sorted image signal based on the correction data of 12 bits stored in the EEPROM 35a. Further, the image signal processing unit 33a performs enhancement processing and/or the like on the image signal after correction, and then outputs the processed image signal to the image output circuit 34.

(Step S110)

The image output circuit 34 outputs the image signal outputted from the image signal processing unit 33a to an external monitor (not illustrated) as an analog and digital RGB (red, green, blue) signals, and a corrected image is displayed on this monitor.

Reading of the correction data from the EEPROM 24 of the head 20 by the MPU 35c is performed in a period in which no other data (for example, the image signal of the image sensor 21) are transmitted/received between the head 20 and the CCU 30.

As described above, in the endoscope apparatus 1 according to the first embodiment, among the correction data correcting the base noise in the image signal of the image sensor 21, data of 8 higher-order bits of the correction data larger than 4 bits are transferred to the CCU 30 in priority, and the image signal of the image sensor 21 is corrected using the transferred correction data of 8 higher-order bits. The number of pixels for which there are correction data larger than 4 bits is generally small (in the first place, an image sensor with many pixels for which there are correction data larger than 4 bits is not suitable as an image sensor), and thus this transfer finishes shortly.

In this stage, correction of the image signal for the data of 4 lower-order bits is not performed. However, since correction of the image signal has been performed regarding the amount of 8 higher-order bits which largely affect visibility, noise is suppressed to the level that there is no problem in visibility of the image. As a result, after turning on the power of the endoscope apparatus 1, the user can obtain a clear image after correction in a shorter time than conventional apparatuses, and thus convenience for the user improves largely.

In the first embodiment, although the correction data for pixels for which there are correction data larger than 4 bits are the target for transfer in priority, the criterion for the correction data to be transferred in priority is arbitrary. For example, the correction data for pixels for which there are correction data larger than 6 bits may be transferred in priority, or the correction data for pixels for which there are correction data larger than 8 bits may be transferred in priority.

In the first embodiment, for pixels for which there are correction data larger than 4 bits, the correction data are adjusted to 12 bits, and for pixels for which there are correction data of 4 bits or smaller, the correction data are adjusted to 4 bits. However, it is also possible to store the number of bits of the correction data for respective pixels in the EEPROM 24 of the head 20 without adjusting these data. In this case, it is necessary to store the number of bits of the correction data for respective pixels in a correlated manner so that it is possible to recognize from what point to what point of read correction data is the correction data for one of the pixels when the MPU 35*c* of the CCU 30 reads out the correction data of the EEPROM 24.

(Modification Example of the First Embodiment)

In the first embodiment, an embodiment has been described in which, out of the correction data of respective pixels of the CMOS sensors, data of 8 higher-order bits of the correction data for pixels for which the data amount is more than 4 bits are transferred to the CCU 30 in priority, and thereafter data of 4 lower-order bits are transferred for all the pixels of the CMOS sensors.

In a modification example of the first embodiment, an embodiment will be described in which, out of the correction data of respective pixels of the CMOS sensors, data of 12 bits for pixels for which the data amount is larger than 4 bits are transferred to the CCU 30 in priority, and thereafter the correction data of the rest of the pixels are transferred to the CCU 30. Hereinafter, an endoscope apparatus 1A according to the modification example of the first embodiment will be described. However, the structure of the endoscope apparatus 1A according to the modification example of the first embodiment is the same as the structure of the endoscope apparatus 1 according to the first embodiment, and thus the apparatus will be described with reference to FIG. 1, FIG. 2, and FIG. 6.

(Correction Data)

The EEPROM 24 of the endoscope apparatus 1A according to the modification example of the first embodiment stores the correction data for all the pixels of the CMOS sensors provided in the image sensor 21, and the data are stored in the order of following 1 to 3. When the correction data stored in the EEPROM 24 are read, they are read in the order of 1→2→3.

1: The number of pixels for which there are correction data larger than 4 bits.
2: The correction data of 12 bits and addresses of pixels for which there are correction data larger than 4 bits.
3: The correction data of the rest of the pixels.

Also in the modification example of the first embodiment, for pixels for which there are correction data larger than 4 bits, the correction data are adjusted to 12 bits, and for pixels for which there are correction data of 4 bits or smaller, the correction data are adjusted to 4 bits.

(Creation of the Correction Data)

Figure 8:
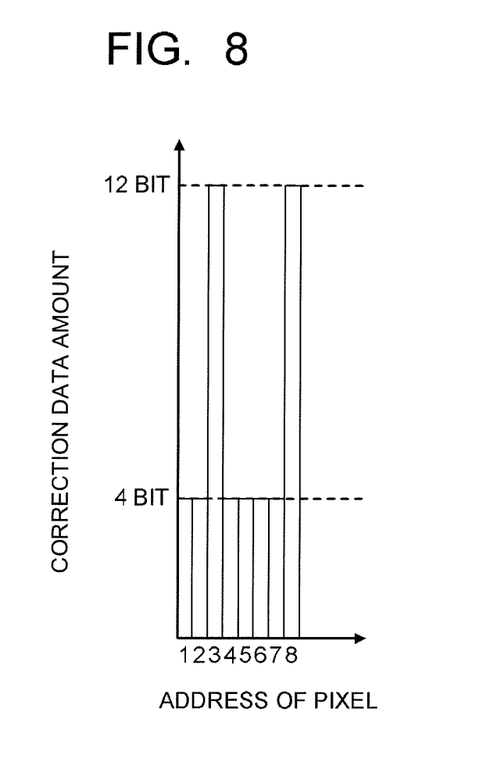
FIG. 8 is an explanatory diagram of a creation procedure of correction data.

Next, a creation procedure of the correction data to be stored in advance in the EEPROM 24 will be described. FIG. 8 is an explanatory diagram of the creation procedure of the correction data. FIG. 8 illustrates correction data in which, for pixels for which there are correction data larger than 4 bits, the correction data are adjusted to 12 bits, and for pixels for which there are correction data of 4 bits or smaller, the correction data are adjusted to 4 bits.

First, the correction data which cancel out the base noise are created for every pixel of the CMOS sensors. Next, out of the created correction data of respective pixels, the number of pixels for which the data amount is larger than 4 bits is stored in the EEPROM 24. Further, the correction data for pixels for which the data amount is larger than 4 bits are stored in the EEPROM 24 together with addresses of the pixels. Finally, the correction data for the rest of the pixels are stored in the EEPROM 24 in the order of addresses.

In the example illustrated in FIG. 5, the correction data for pixels with addresses of "3" and "8" are larger than 4 bits, and thus the number of pixels "2" is stored first in the EEPROM 24. Then, the correction data for addresses of "3" and "8" are stored together with the addresses. Finally, the correction data for the pixels with addresses "1", "2", "4" to "7" other than the pixels with addresses "3" and "8" are stored in the order of addresses.

(Reading Operation of the MPU 35*c*)

Next, reading of the correction data of the EEPROM 24 of the head 20 will be described. First, the MPU 35*c* reads out the number of pixels stored in the EEPROM 24 of the head 20. Next, the MPU 35*c* reads out the correction data of 12 bits and the addresses of pixels for which there are correction data larger than 4 bits from the EEPROM 24 and stores them in the EEPROM 35*a* of the CCU 30. The read correction data are stored in the order of the addresses being read together with the correction data.

The MPU 35*c* increments the value of an internal counter every time the correction data and the address of a pixel are read. At the point the value of the internal counter becomes equal to the number of pixels read from the EEPROM 24, the MPU determines that reading of the correction data for pixels for which there are correction data larger than 4 bits is finished, and outputs the reading completion signal for the first time.

After reading the correction data and the addresses of pixels for which there are correction data larger than 4 bits, subsequently the MPU 35*c* sequentially reads out the rest of the correction data (the correction data for pixels for which there are correction data of 4 bits or smaller) and stores them in the EEPROM 25*a*. At this time, the address of a pixel which is read in advance is skipped, and the rest of the correction data are stored in the EEPROM 25*a*. Alternatively, "0" is added to the address of a pixel which is read in advance, and the rest of the correction data are stored in the EEPROM 25*a*.

Operation of the other components of the endoscope apparatus 1A according to the modification example of the first embodiment is the same as that of the endoscope apparatus 1 according to the first embodiment described with FIG. 1, FIG. 2, and FIG. 6, and thus the duplicating descriptions are omitted. Effects of the endoscope apparatus 1A according to the modification example of the first embodiment are the same as those of the endoscope apparatus 1 according to the first embodiment.

Similarly to the first embodiment, the criterion for the correction data to be transferred in priority is arbitrary. For example, the correction data for pixels for which there are correction data larger than 6 bits may be transferred in priority, or the correction data for pixels for which there are correction data larger than 8 bits may be transferred in priority.

Regarding cases other than the case where, as in the embodiment, for pixels for which there are correction data larger than 4 bits, the correction data are adjusted to 12 bits, and for pixels for which there are correction data of 4 bits or smaller, the correction data are adjusted to 4 bits, it should be noted that it is necessary to add the data amount (number of bits) of the correction data stored in the EEPROM 24 to every correction data. By adding the data amount (number of bits) of the correction data to every correction data, it is possible on the CCU 30 side to recognize the unit of correction data (from what point to what point is one piece of correction data) to be read from the EEPROM 24 of the head 20.

(Second Embodiment)

In the first embodiment, an embodiment has been described in which the correction data for cancelling the base noise for pixels for which there are correction data larger than 4 bits are transferred in priority. However, when the base noise occurs in plural adjacent pixels, the visibility of the image decreases even if the level of the noise is small.

Figure 9:
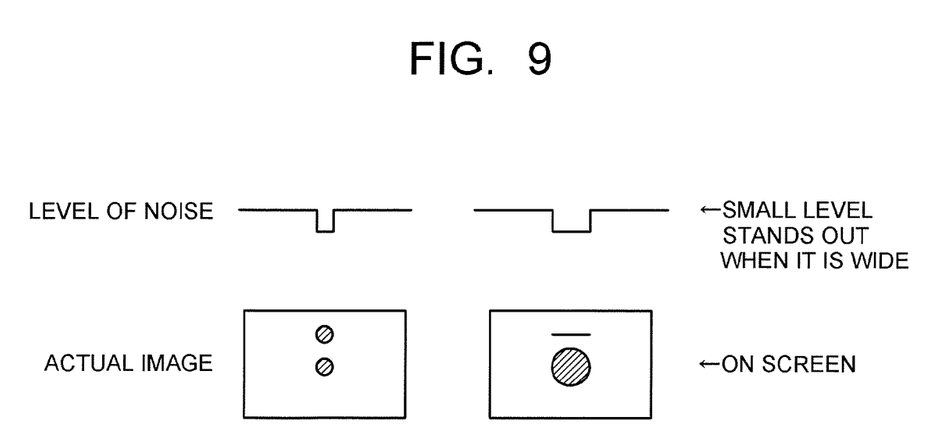
FIG. 9 is a diagram illustrating an example of noise.

In the second embodiment, a correcting method for the case where the base noise occurs in plural adjacent pixels will be described. FIG. 9 is a diagram illustrating an example of noise corrected in the second embodiment. As illustrated in FIG. 9, when the base noise occurs in plural adjacent pixels, it stands out even when the level of the noise is small, compared to the case where the base noise occurs independently. Thus, the visibility of the image decreases.

Accordingly, in the endoscope apparatus 2 according to the second embodiment, the level of the noise to be transferred in priority is changed depending on the area (size) of the noise on an image. Hereinafter, the endoscope apparatus 2 according to the second embodiment will be described. However, the structure of the endoscope apparatus 2 according to the second embodiment is the same as the structure of the endoscope apparatus 1 according to the first embodiment, and thus the apparatus will be described with reference to FIG. 1, FIG. 2, and FIG. 6.

Figure 10A:
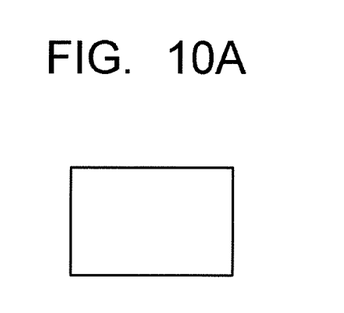
FIGS. 10A to 10C are explanatory diagrams for respective cases.
Figure 10B:
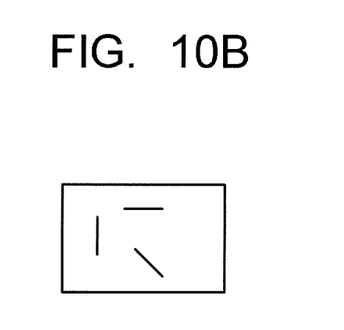
Figure 10C:
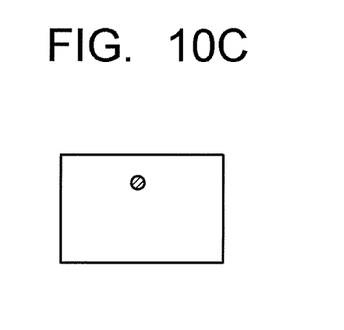

In the second embodiment, the level of the noise to be corrected in priority is changed corresponding to the following three cases. FIGS. 10A to 10C are explanatory diagrams for the respective cases.

1: Pixels are not adjacent (FIG. 10A).
2: Three or more pixels are aligned straight vertically, horizontally, or orthogonally (FIG. 10B).
3: Plural pixels have an area (FIG. 10C).

In the above case of 1, the correction data for pixels with a displacement of more than 8% from the reference level of a picture signal (100% of the signal) are transferred in priority from the EEPROM 24 of the head 20 to the EEPROM 35a of the CCU 30.

In the above case of 2, the correction data for pixels with a displacement of more than 5% from the reference level of a picture signal (100% of the signal) are transferred in priority from the EEPROM 24 of the head 20 to the EEPROM 35a of the CCU 30.

In the above case of 3, the correction data for pixels with a displacement of more than 3% from the reference level of a picture signal (100% of the signal) are transferred in priority from the EEPROM 24 of the head 20 to the EEPROM 35a of the CCU 30.

The criterion for the correction data to be transferred in priority is arbitrary and need not necessarily be 3%, 5%, or 8%. It will suffice when reference values are such that the reference value of the above 1<the reference value of the above 2<the reference value of the above 3.

(Correction Data)

The EEPROM 24 of the endoscope apparatus 2 according to the second embodiment stores the correction data for all the pixels of the CMOS sensors provided in the image sensor 21, and the data are stored in the order of following 1 to 3. When the correction data stored in the EEPROM 24 are read, they are read in the order of 1→2→3.

1: The number of pixels with a displacement of more than 8% from the reference level of the picture signal (100% of the signal) when the pixels are not adjacent (see FIG. 10A)+the number of pixels with a displacement of more than 5% from the reference level of the picture signal (100% of the signal) when three or more pixels are aligned straight vertically, horizontally, or orthogonally (see FIG. 10B)+the number of pixels with a displacement of more than 3% from the reference level of the picture signal (100% of the signal) when plural pixels have an area (see FIG. 10C).

2: Correction data and addresses when pixels are not adjacent+correction data and addresses when three or more pixels are aligned straight vertically, horizontally, or orthogonally+correction data and addresses when plural pixels have an area.

3: The rest of correction data and addresses.

(Creation of the Correction Data)

Next, a creation procedure of the correction data to be stored in advance in the EEPROM 24 will be described. First, the correction data which cancel out the base noise are created for every pixel of the CMOS sensors. Then, out of the created correction data of respective pixels, there is stored in the EEPROM 24 the total number of the number of pixels with a displacement of more than 8% from the reference level of the picture signal (100% of the signal) when the pixels are not adjacent, the number of pixels with a displacement of more than 5% from the reference level of the picture signal (100% of the signal) when three or more pixels are aligned straight vertically, horizontally, or orthogonally, and the number of pixels with a displacement of more than 3% from the reference level of the picture signal (100% of the signal) when plural pixels have an area.

Next, the correction data and addresses when pixels are not adjacent, the correction data and addresses when three or more pixels are aligned straight vertically, horizontally, or orthogonally, and the correction data and addresses when plural pixels have an area are stored in the EEPROM 24. Finally, the correction data for the rest of the pixels are stored in the EEPROM 24 in the order of addresses.

(Reading Operation of the MPU 35c)

Next, reading of the correction data of the EEPROM 24 of the head 20 will be described. First, the MPU 35c reads out the number of pixels stored in the EEPROM 24 of the head 20. Next, the MPU 35c reads out the correction data and addresses when pixels are not adjacent, the correction data and addresses when three or more pixels are aligned straight vertically, horizontally, or orthogonally, and the correction data and addresses when plural pixels have an area from the EEPROM 24, and stores them in the EEPROM 35a of the CCU 30. The read correction data are stored in the order of the addresses being read together with the correction data.

The MPU 35c increments the value of an internal counter every time the correction data and the address of a pixel are read. At the point the value of the internal counter becomes equal to the number of pixels read from the EEPROM 24, the MPU determines that reading of the correction data is finished, and outputs the reading completion signal for the first time.

Subsequently, the MPU 35c sequentially reads out the rest of the correction data and stores them in the EEPROM 25a. At this time, the address of a pixel which is read in advance is skipped, and the rest of the correction data are stored in the EEPROM 25a. Alternatively, "0" is added to the address of a pixel which is read in advance, and the rest of the correction data are stored in the EEPROM 25a.

Operation of the other components of the endoscope apparatus 2 according to the second embodiment is the same as that of the endoscope apparatus 1 according to the first embodiment described with FIG. 1, FIG. 2, and FIG. 6, and thus the duplicating descriptions are omitted.

As described above, in the endoscope apparatus 2 according to the second embodiment, even when the level of noise is small, the criterion for the noise level for transfer in priority is raised when the pixels are adjacent. Thus, the visibility of an image improves, and convenience for the user improves further. Other effects are the same as those in the endoscope apparatus 1 according to the first embodiment.

(Third Embodiment)

In the above-described first and second embodiments, correction of the base noise has been described. However, it is also possible to correct the fixed pattern noise whose level changes due to external environment (for example, temperature and brightness). In the third embodiment, an embodiment correcting the fixed pattern noise (for example, white spot and black spot) other than the base noise will be described.

A white spot refers to a pixel defect such that pixel data with values higher than those which should be originally outputted are outputted, and the pixel corresponding to the light receiving element thereof appears to be white, and occurs mainly due to a dark current. The dark current refers to a weak current which flows in the CMOS sensors even when no light is radiated, and occurs mainly due to a thermal factor or insulation failure. When the dark current is large, it causes noise in the image.

Further, a black spot refers to a pixel defect such that pixel data with values lower than those which should be originally outputted are outputted, and the pixel corresponding to the light receiving element thereof appears to be black, and occurs mainly due to dust in the CMOS sensors. It is a failure which occurs when the dust blocks the light to be incident on pixels of the CMOS sensors or when the circuits of the CMOS sensors are short circuited.

Hereinafter, an endoscope apparatus 3 according to the third embodiment will be described. However, the structure of the endoscope apparatus 3 according to the third embodiment is the same as the structure of the endoscope apparatus 1 according to the first embodiment, and thus the apparatus will be described with reference to FIG. 1, FIG. 2, and FIG. 6.

(Correction Data)

In the EEPROM 24 of the endoscope apparatus 3 according to the third embodiment, the number of pixels and addresses where pixel defects such as white spot and black spot have occurred are stored, out of all the pixels of the CMOS sensors provided in the image sensor 21.

(Reading Operation of the MPU 35c)

Next, reading of the correction data of the EEPROM 24 of the head 20 will be described. The MPU 35c reads out the number of pixels stored in the EEPROM 24 of the head 20. Next, the MPU 35c reads out the addresses stored in the EEPROM 24 and stores them in the EEPROM 35a of the CCU 30.

The MPU 35c increments the value of an internal counter every time the address of a pixel is read. At the point the value of the internal counter becomes equal to the number of pixels read from the EEPROM 24, the MPU determines that reading of the addresses is finished, and outputs a completion signal.

(Correction Operation of the Image Signal Processing Unit 33a)

Next, correction operation of the image signal processing unit 33a of the CCU 30 will be described. When the completion signal is inputted from the MPU 35c, the image signal processing unit 33a corrects the image signal of a defective pixel based on the addresses of pixels stored in the EEPROM 35a of the CCU 30 from the EEPROM 24 of the head 20 by the MPU 35c.

Figure 11:
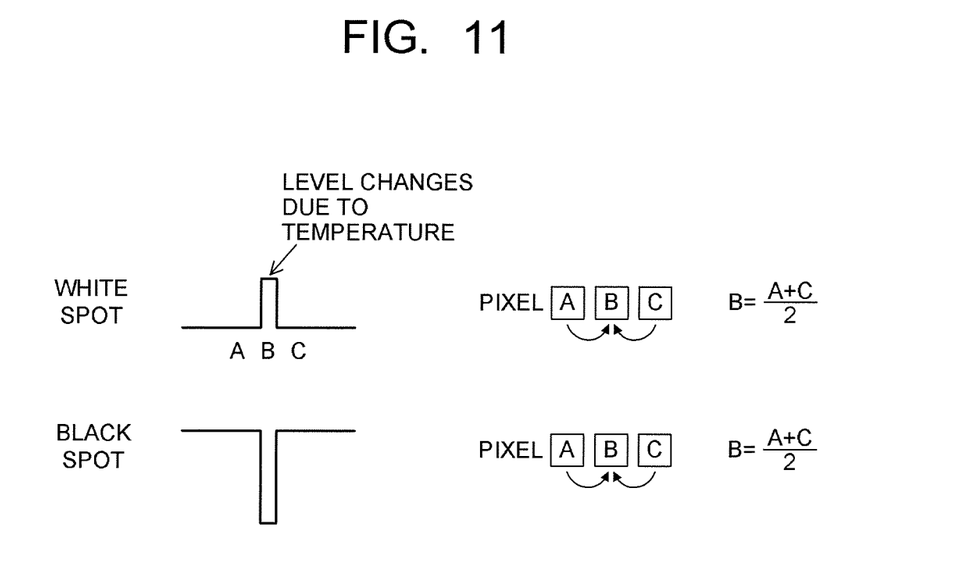
FIG. 11 is an explanatory diagram of a correcting method of defective pixels.

FIG. 11 is a diagram illustrating a method for correcting a defective pixel. The image signal processing unit 33a sorts image signals of respective pixels in the order of addresses based on the addresses given to the image signal of every pixel, and thereafter corrects the image signal of a pixel where a pixel defect has occurred. Specifically, as illustrated in FIG. 11, the image signal processing unit 33a adds image signals of both left and right adjacent pixels of a defective pixel and divides the added value by two, and designates the resultant value as an image signal of the defective pixel, thereby correcting the image signal of the defective pixel.

Correction of defective pixels may be such that image signals of both upper and lower adjacent pixels are added and divided by two, or image signals of four pixels which are upper, lower, left and right pixels of a defective pixel are added and divided by four. Operation of the other components of the endoscope apparatus 3 according to the third embodiment is the same as that of the endoscope apparatus 1 according to the first embodiment described with FIG. 1, FIG. 2, and FIG. 6, and thus the duplicating descriptions are omitted.

It is also possible to combine the third embodiment with the first and second embodiments. When combined with the first embodiment, defective pixels may be corrected before correcting pixels for which there are correction data of 4 bits or smaller. Accordingly, the apparatus may be structured to correct defective pixels after pixels for which there are correction data larger than 4 bits are corrected, or to correct pixels for which there are correction data larger than 4 bits after defective pixels are corrected. In this case, not only the base noise but also the defective pixels of black spot, white spot, or the like can be corrected. Thus, the visibility of an image improves further. Other effects are the same as those of the endoscope apparatus 1 according to the first embodiment.

(Fourth Embodiment)

In the above-described first and second embodiments, the apparatus may also be structured to transfer the correction data in order from data of highly visible colors. In the fourth embodiment, an embodiment transferring the correction data in order from data of highly visible colors will be described.

For example, respective primary colors (R, G, B) of a luminance signal are weighted such that Y=0.7 G+0.2 R+0.1 B. In the aforementioned example, the weighting is higher in the order of G (Green), R (Red), B (Blue), and thus the apparatus may be structured to transfer the correction data of pixels for which the data amount is larger than 4 bits in the order of pixels of G (Green), R (Red), B (Blue) out of the correction data of respective pixels of the CMOS sensors.

The apparatus may also be structured to change the criterion for transferring the correction data in priority for every one of pixels of R (Green), R (Red), B (Blue). Noise stands out in a color with high visibility, and thus it is conceivable that the criterion for G is set highest and the criterion for B is set lowest. For example, the reference for transferring the correction data in priority may be set such that the correction data are transferred from the ones for pixels with a displacement from the reference voltage (for example, 5 V) of more than 3% (G), 5% (R), and 8% (B) of the full scale (for example, 12 V) in priority.

The imaging apparatus or the endoscope apparatus according to at least one of the above-described embodiments includes: a head unit including an imaging unit having a plurality of pixels and imaging a subject, and a storage unit storing correction information for pixels for which a data amount of correction information is larger than a predetermined threshold out of correction information correcting noise of the plurality of pixels and remaining correction data; and a main unit including a correction information obtaining unit obtaining the correction information for pixels for which the data amount of correction information is larger than the predetermined threshold in priority and then obtaining the remaining correction data, and a correcting unit correcting, when the correction information obtaining unit completes obtaining of the correction information for pixels for which the data amount of correction information is larger than the predetermined threshold, an image signal transmitted from the imaging unit of the head unit based on the obtained correction information. Therefore, a clear image after correction can be obtained in a shorter time than conventional apparatuses.

For example, the apparatus may be structured such that an ID (identifier) is stored in the EEPROM 24 of the head 20, and table data correlating the ID with the number of pixels is stored in the EEPROM 35*a* of the CCU 30. In such a structure, even when the head 20 is replaced, it is possible to recognize the number of pixels of the image sensor 21 provided in the head 20 from the ID read from the head 20.

While certain embodiments have been described, these embodiments have been presented by way of example only, and are not intended to limit the scope of the inventions. Indeed, the novel embodiments described herein may be embodied in a variety of other forms; furthermore, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A head separated type imaging apparatus comprising a head unit and a main unit which are separated, the head unit imaging a subject and the main unit processing an image signal transmitted from the head unit, wherein the head unit comprises:

an imaging unit having a plurality of pixels to image the subject; and a storage unit configured to store correction information obtained for each of the plurality of pixels based on a magnitude of noise existing in signals from each of the plurality of pixels and to store a number of pixels for which the number of bits is larger than a predetermined threshold, and wherein the main unit comprises:

a correction information obtaining unit configured to obtain a part of correction information corresponding to a pixel having a larger number of bits than the predetermined threshold from the storage unit, the part of correction information being obtained from higher-order bits of the correction information, the correction information obtaining unit further obtains remaining correction information from the storage unit after obtaining the part of correction information from higher-order bits in priority and outputs a reading completion signal when a number of the correction information read out from the storage unit in priority becomes equal to the number of pixels stored in the storage unit; and a correcting unit configured to correct, when the correction information obtaining unit completes obtaining of the part of correction information, the image signal transmitted from the imaging unit of the head unit based on the obtained correction information, the correcting unit further corrects, when the reading completion signal is outputted from the correction information obtaining unit, the image signal transmitted from the imaging unit of the head unit based on the correction information obtained by the correction information obtaining unit.

2. The apparatus of claim 1, wherein the correcting unit corrects, when the correction information obtaining unit completes obtaining of the remaining correction information, the image signal transmitted from the imaging unit of the head unit based on the obtained the part of correction information in priority and remaining correction information.

3. The apparatus of claim 1, wherein the correction information obtaining unit obtains the correction information for which the number of bits is larger than the predetermined threshold in order of pixels of green, red, and blue.

4. The apparatus of claim 1, wherein the predetermined threshold becomes smaller corresponding to a number of adjacent pixels having the noise.

5. The apparatus of claim 1, wherein the higher-order bits of the correction information include a plurality of bits above a least significant nibble of the correction information.

6. An running method of a head separated type imaging apparatus comprising a head unit and a main unit which are separated, the head unit imaging a subject and the main unit processing an image signal transmitted from the head unit, providing an imaging unit having a plurality of pixels to image the subject and a storage unit configured to store correction information obtained for each of the plurality of pixels based on a magnitude of noise existing in signals from each of the plurality of pixels in the head unit, and a correction information obtaining unit configured to obtain the correction information and a correcting unit configured to correct the image signal transmitted from the imaging unit in the main unit;

obtaining a part of correction information corresponding to a pixel having a larger number of bits than a predetermined threshold from the storage unit, the part of correction information being obtained from higher-order bits of the correction information by the correction information obtaining unit;

obtaining remaining correction information from the storage unit after obtaining the part of correction information from higher-order bits in priority;

imaging the subject by the imaging unit; and correcting, when the correction information obtaining unit completes obtaining of the part of correction information, the image signal transmitted from the imaging unit of the head unit based on the obtained correction information by the correcting unit, wherein the storage unit further stores a number of pixels for which the number of bits is larger than the predetermined threshold, wherein the correction information obtaining unit outputs a reading completion signal when a number of the correction information read out from the storage unit in priority becomes equal to the number of pixels stored in the storage unit, and wherein the correcting unit corrects, when the reading completion signal is outputted from the correction information obtaining unit, the image signal transmitted from the imaging unit of the head unit based on the correction information obtained by the correction information obtaining unit.

7. The method of claim 6,
wherein the correction information obtaining unit obtains remaining correction information from the storage unit after obtaining the part of correction information from higher-order bit in priority; and
wherein the correcting unit corrects, when the correction information obtaining unit completes obtaining of the remaining correction information, the image signal transmitted from the imaging unit of the head unit based on the obtained the part of correction information in priority and remaining correction information.

8. The method of claim 6,
wherein the correction information obtaining unit obtains the correction information for which the number of bits is larger than the predetermined threshold in order of pixels of green, red, and blue.

9. The method of claim 6,
wherein the predetermined threshold becomes smaller corresponding to a number of adjacent pixels having the noise.

10. The method of claim 6, wherein the higher-order bits of the correction information include a plurality of bits above a least significant nibble of the correction information.

11. A head separated type endoscope apparatus comprising a head unit and a main unit which are separated, the head unit including a scope to be inserted into a subject to be inspected and imaging an inside of the subject to be inspected and the main unit processing an image signal transmitted from the head unit,
wherein the head unit comprises:
an imaging unit having a plurality of pixels to image the subject; and
a storage unit configured to store correction information obtained for each of the pixels based on a magnitude of noise existing in signals from each of plurality of pixels, the storage unit further stores a number of pixels for which the number of bits is larger than a predetermined threshold, and
wherein the main unit comprises:
a correction information obtaining unit configured to obtain a part of correction information corresponding to a pixel having a larger number of bits than the predetermined threshold from the storage unit, the part of correction information being obtained from higher-order bits of the correction information, the correction information obtaining unit further obtains remaining correction information from the storage unit after obtaining the part of correction information from higher-order bits in priority and outputs a reading completion signal when a number of the correction information read out from the storage unit in priority becomes equal to the number of pixels stored in the storage unit; and
a correcting unit configured to correct, when the correction information obtaining unit completes obtaining of the part of correction information, the image signal transmitted from the imaging unit of the head unit based on the obtained correction information, the correcting unit further corrects, when the reading completion signal is outputted from the correction information obtaining unit, the image signal transmitted from the imaging unit of the head unit based on the correction information obtained by the correction information obtaining unit.

12. The apparatus of claim 11,
wherein the correction information obtaining unit obtains remaining correction information from the storage unit after finishing to obtain the part of correction information from higher-order bit in priority; and
wherein the correcting unit corrects, when the correction information obtaining unit completes obtaining of the remaining correction information, the image signal transmitted from the imaging unit of the head unit based on the obtained the part of correction information in priority and remaining correction information.

13. The apparatus of claim 11,
wherein the correction information obtaining unit obtains the correction information for which the number of bits is larger than the predetermined threshold in order of pixels of green, red, and blue.

14. The apparatus of claim 11,
wherein the predetermined threshold becomes smaller corresponding to a number of adjacent pixels having the noise.

15. The apparatus of claim 11, wherein the higher-order bits of the correction information include a plurality of bits above a least significant nibble of the correction information.

* * * * *